United States Patent [19]

Arima et al.

[11] Patent Number: 4,556,565

[45] Date of Patent: Dec. 3, 1985

[54] SWEETENER COMPOSITION, PROCESS FOR MAKING THE SAME, AND COMESTIBLES COMPRISING SAID SWEETENER COMPOSITION

[76] Inventors: Tetsuo Arima, Room 301, Kurebayashi Mansion 3-9-8, Shimorenjaku, Mitaka, Tokyo 181; Akio Kawamoto, Room 603, Shimoda Bldg. 1-6-2, Yasujima, Yokkaichi Mie Pref. 510; Hide Osawa, Room 301, Teio Plaza 1-7-27, Sanjo, Suzuka, Mie Pref., 513, all of Japan

[21] Appl. No.: 548,734

[22] Filed: Nov. 4, 1983

[51] Int. Cl.⁴ ............................................... A23G 3/30
[52] U.S. Cl. ....................................... 426/3; 426/548; 426/658; 426/804
[58] Field of Search ........................................ 426/3–6, 426/548, 804

[56] References Cited

U.S. PATENT DOCUMENTS

| | | | |
|---|---|---|---|
| 4,007,288 | 2/1977 | Glicksman et al. | 426/548 |
| 4,036,992 | 7/1977 | Bahoshy et al. | 426/3 |
| 4,122,195 | 10/1978 | Bahosky et al. | 426/548 |
| 4,208,431 | 6/1980 | Friello | 426/548 |
| 4,248,895 | 2/1981 | Stroz et al. | 426/3 |
| 4,271,197 | 6/1981 | Hopkins et al. | 426/3 |
| 4,328,249 | 5/1982 | Mackay et al. | 426/3 |
| 4,357,354 | 11/1982 | Kehoe et al. | 426/548 |

*Primary Examiner*—Jeanette Hunter
*Attorney, Agent, or Firm*—Thomas A. Marcoux; Thomas R. Savoie; Daniel J. Donovan

[57] ABSTRACT

An improved sugarless chewing gum containing a sweetener composition of APM, hydrogenated starch hydrolysate and/or hydrogenated maltose and a sugar alcohol wherein the chewing gum base excludes calcium carbonate and talc, and includes microcrystalline cellulose in lieu thereof.

6 Claims, No Drawings

SWEETENER COMPOSITION, PROCESS FOR MAKING THE SAME, AND COMESTIBLES COMPRISING SAID SWEETENER COMPOSITION

TECHNICAL FIELD

The present invention relates to a new sweetener composition, comestibles containing said sweetener composition, especially a chewing gum; and the processes for producing said sweetener composition and said chewing gum.

More particularly, the sweetener composition is freely water-soluble and has a low calorie value with little dental caries causing effect which contains an L-aspartic acid derived dipeptide compound (hereunder referred to as a dipeptide compound).

The comestibles containing said sweetener composition include a dipeptide compound plus hydrogeneated starch hydrolyzate, hydrogenated maltose, sugar alcohol, an edible organic acid and sodium citrate, glucono-delta-lactone, or combinations thereof. Additionally, in a chewing gum according to the present invention, in the chewing gum base the calcium carbonate and talc may be replaced by microcrystalline cellulose powder.

L-aspartic acid derived dipeptide compounds such as L-asparyl-L-phenylalanine methyl ester (hereafter referred to as APM) have recently attracted the attention of researchers for their use as sweeteners having low calorie value but high sweetness, but one great problem with them is low dispersibility or solubility in water. Several proposals have been made for increaseing the water dispersibility or solubility of the dipeptide compounds. Among such proposals is a method wherein the dipeptide compound is dissolved or dispersed in water together with various carriers such as citric acid, dextrin, polyhydric alcohols, sugar alcohols, polysaccharides, polypeptides, protein and calcium primary phosphate, and the resulting solution or slurry is dried and reduced to fine particles. But the carriers used in this method have various defects when they are used as ingredients for the low calorie value sweetener. The defects of each carrier are listed below.

Citric acid . . . It has a sour taste that is not wanted in a sweetener. It cannot be used together with a substance (e.g. protein) that is affected by the presence of an acid.

Dextrin . . . Its calorie value is as high as that of sucrose, and it may cause dental caries.

Polyhydric alcohols . . . They cannot be easily reduced to fine particles which are preferred for incorporation in a sweetener. Sugar alcohols . . . They have a calorie value equal to that of sucrose, and cannot be easily reduced to fine particles.

Polysaccharides . . . When they are dissolved or dispersed in water, a viscous solution or slurry that is hard to process is formed.

Polypeptides and protein . . . They are not suitable for use under acidic conditions, for example, they cannot be added to orange juice, for they form a precipitate.

Primary calcium phosphate . . . The phosphate ion or calcium ion may have adverse effects on foodstuffs.

Moreover, while sucrose, glucose and sugar syrup have conventionally been used as sweeteners in comestibles such as chewing gum, the flavor and sweetness of the comestible is made sensible by chewing. In a chewing gum, the sweeteners for chewing gum must dissolve at a proper rate and provide the gum with a smooth texture. The above mentioned three sugars meet these requirements. But when the comestible is in the mouth, these sugars are subjected to the action of bacteria in the mouth and form organic acids that cause dental caries. Also, these sugars have calorie value and undesirably cause an excessive calorie intake.

Sugar syrup is a sweetener but also is indispensable as a binder that gives the chewing gum a smooth texture and a suitable degree of softness. An attempt has been made to replace syrup by glycerin or the like, but the resulting chewing gum formulation is not easily formed into sheets and the binding action of glycerin or other syrup substitute is not as great as that of syrup. For example, chewing gum using glycerin instead of syrup does not have the desired softness or stretchability and feels "hard" to the mouth when it is chewed.

APM is a sweetener that is 180 to 200 times as sweet as sucrose, has low calorie value and has low dental caries causing effect. An attempt has also been made to use APM in chewing gum, but the chewing gum containing APM does not have satisfactory characteristics (e.g. high softness and stretchability, and good mouthfeel during chewing) unless it is combined with sucrose, glucose or sugar syrup.

SUMMARY OF THE INVENTION

As a result of various studies to eliminate these defects, the present inventors have both found carriers that are free from these defects and which have low calorie value are freely water-dispersible or soluble and which yet have little dental caries causing effect; and developed comestibles such as chewing gum that has good mouthfeel during chewing, has good physical properties such as high softness and stretchability, and which retains its flavor and sweetness for an extended time period and which yet has low calorie value and little dental caries causing effect.

DETAILED DESCRIPTION OF THE INVENTION

The dipeptide compounds used in the present invention are L-aspartic acid derived sweeteners which include L-aspartyl-L-phenylalanine methyl ester, methyl esters of L-aspartyl-L-phenylglycine and L-aspartyl-L-2,S-dihydrophenyl-glycine, L-aspartyl-2,5-dihydro-L-phenylalanine and L-aspartyl-L-(1-cyclohexy-en)-alanine. L-aspartyl-L-phenylalanine methyl ester (APM) is particularly preferred. The dipeptide compounds are 180 to 200 times as sweet as sucrose and taste very much like sucrose without a bitter or other unpleasant aftertastes. Since they are peptides, they are less likely to cause dental caries than sucrose.

The carriers used in the present invention include hydrogenated starch hydrolyzate, hydrogenated maltose and mixtures thereof. The hydrogenated starch hydrolyzate and hydrogenated maltose have low calorie value (less than 60% of that of sucrose), and although their sweetness is 80 to 10% of that of sucrose, they have no other taste or odor and are very suitable for use as carriers for sweeteners. One great advantage of these substances is that they are not subjected to the bacterial action in the mouth to form organic acids which can cause dental caries. As another advantage, the substances can be easily reduced to fine particles which are simple to handle during the manufacture of sweetener compositions. The sweetener composition prepared by using these carriers is easily dispersible or soluble in water, and produces no protein precipitate even if it is added to an aqueous solution containing protein. Therefore, the present invention provides a sweetener composition that has a sweet taste of good quality and which yet has low calorie value and little dental caries causing effect.

The sweetener composition of the present invention is produced by the following method. Mix the hydrogenated starch hydrolyzate, hydrogenated maltose or a mixture of the two with the dipeptide compound in a weight ratio of 0.1–95:99.9–5, preferably 10–85:90:–15. Add the mixture to water and stir to form a solution. To form the desired solution in a short time, warm water heated at, say, 28°–40° C. is preferably used. Use of excessively high temperatures should be avoided to prevent the decomposition of APM. The resulting solution is homogenized as required, and thereafter, it is dried to solid by conventional means such as spray-drying, freeze-drying or vacuum-drying, and pulverized to a suitable particle size, say about 20–80 mesh. The so prepared sweetener powder may be granulated to improve its dispersibility or solubility further. Before granulation, the sweetener composition is preferably pulverized to a finer mesh, say, 100–150 mesh. The pulverized composition is then granulated by suitable means such as fluidized bed granulation, steam granulation or spray-drying granulation.

The sweetener used in a comestible according to the present invention comprises APM plus another component selected from the group hydrogenated starch hydrolyzate, hydrogenated maltose, an edible organic acid and sodium citrate, glucono-delta-lactone used in an amount to provide a pH of 4.3±1.0, a vegetable gum, and combinations thereof. It is prefered that the sweetener be composed of APM hydrogenated starch hydrolyzate, hydrogenated maltose, or a combination of hydrogenated starch hydrolyzate and hydrogenated maltose; and an edible organic acid, sodium citrate, glucono-delta-lactose used in an amount effective to produce a pH of about 4.3 (i.e. ± about 1.0), or a combination of an edible organic acid, sodium citrate, and/or glucono-delta-lactose. Alternatively, it is also prefered that the sweetener is comprised of APM and hydrogenated starch hydrolyzate, hydrogenated maltose, or a combination of hydrogenated starch hydrolyzate and hydrogenated maltose. It is further prefered that the alternative sweetener be comprised of APM; hydrogenated starch hydrolyzate, hydrogenated maltose, or a combination of hydrogenated starch hydrolyzate and hydrogenated maltose; and a vegetable gum. Chewing gum, a comestible illustrative of the present invention containing such sweetener is prepared by the following method: the ingredients are dissolved in water, the solution is dried, the dried mixture is reduced to fine particles to make a sweetener composition having the APM encapsulated in the hydrogenated starch hydrolyzate and/or hydrogenated maltose (and optional vegetable gum), and the so prepared sweetener is intimately mixed with a sugar alcohol, say mannitol and/or sorbitol in addition to other ingredients to thereby produce a comestible. Nonetheless, if the comestible is chewing gum, the calcium carbonate and talc may preferably be replaced by microcrystalline cellulose powder. In the illustrative comestible, chewing gum, ingredients other than sugar alcohols include a gum base, flavoring and an emulsifier, and any of the conventional chewing gum ingredients can be used. The encapsulated sweetener may also be used with an additional hydrogenated starch hydrolyzate and/or hydrogenated maltose.

The APM becomes very stable by encapsulating it with hydrogenated starch hydrolyzate and/or hydrogenated maltose. But the APM in a chewing gum product does not have long-term stability since it is rapidly decomposed by calcium carbonate in the chewing gum base. To eliminate this adverse effect of calcium carbonate on APM, the present invention uses a chewing gum wherein calcium carbonate is replaced by microcrystalline cellulose powder and prolongs the stability of APM. It is known to use talc in place of calcium carbonate, but talc is not desired for use as an ingredient of chewing gum because of its potential hazard to the human body. Commercial microcrystalline cellulose powder may be used in the present invention, and its average particle size is from 10 to 100 microns, preferably from 40 to 80 microns.

The sweetener used in the present invention is prepared by the following procedure: first mix APM with ether hydrogenated starch hydrolyzate and/or hydrogenated maltose and an edible organic acid and sodium citrate and/or glucono-delta-lactone in a weight ratio of 0.1–10:100:0.1–20, preferably 0.1–3.0:100:0.3–1 hydrogenated starch hydrolyzate (together with a vegetable gum if it has a dextrose equivalent of 25 or more before hydrogenation) and/or hydrogenated maltose in a weight ration of 0.1–95:99.9–5, preferably 10–85:90–15, dissolve the mixture in water, dry the solution, reduce the dried mixture to fine particles to make an APM encapsulated sweetener composition. To form the desired solution in a short time, APM and hydrogenated starch hydrolyzate and/or hydrogenated maltose are preferably dissolved in warm water heated at 28° to 40° C.. Use of excessively high temperatures should be avoided to prevent the decomposition of APM. The resulting solution is homogenized if necessary, and thereafter, it is dried by a common method such as spray-drying, freeze-drying or vacuum drying. The dried mixture may be pulverized by any of the conventional methods to a particle size of about 100–150 mesh as is commonly used for sweeteners for comestibles.

According to the present invention, such sweetener compostion must be used in combination with sorbitol and/or mannitol. These sweeteners are used in an amount of from 40 to 90% by weight, preferably from 50 to 80% by weight, of the total amount of the final comestible compostion.

According to the present invention, part of the sweeteners may be replaced by hydrogenated starch hydrolyzate and/or hydrogenated maltose. The hydrogenated starch hydrolyzate, hydrogenated maltose and vegetable gum have low calorie value (less than 70% of the calorie value of sucrose). Although their sweetness is 80 to 10% of that of sucrose, they have no other taste or odor and hence have no adverse effects on the flavor of a comestible. As another advantage, these substances are not subjected to the bacterial action in the mouth to form organic acids that cause dental caries.

The sweetener of the present invention has APM dispersed in the hydrogenated starch hydrolyzate and/or hydrogenated maltose and possibly vegetable gum as well that have the characteristics described above. In an embodiment of the present invention which uses an edible organic acid and sodium citrate and/or glucono-delta-lactone in an amount to give a pH of about 4.3± about 1.0, this buffering component is addded at this point. This dispersion allows the APM to remain stable for an extended time period to prolong the shelf life of the comestible. Furthermore, the APM has a controlled solubility so it provides prolonged sweetness when the comestible is chewed. The above named substances are also effective in increasing the stability of flavorings.

When an edible organic acid is used in the present invention, the acid is preferably selected from malic acid, citric acid and tartaric acid, and combinations thereof. A sweetener encapsulated in the presence of one, two or three of these organic acids together with sodium citrate and/or glucono-delta-lactone to give a pH of 4.3±1.0 is capable of retaining APM for an extended period without being decomposed by an alkali ingredient, particularly, calcium carbonate incorporated in a chewing gum base.

A chewing gum according to the present invention can be produced by the following method: add a sugar alcohol (i.e. sorbitol and/or mannitol) and, if necessary, hydrogenated starch hydrolyzate and/or hydrogenated maltose, to a conventional chewing gum base, alternatively, the gum base may be a modified conventional gum base wherein the calcium carbonate and talc are replaced by microcrystalline cellulose powder; uniformly knead the mixture at a temperature not higher than 60° C., preferably between 40° and 60° C.; add an emulsifier, glycerin, lecithin and colorant to the mixture and knead; add the APM encapsulated sweetener and a flavoring and alternatively the presence of at least one of the above mentioned edible organic acids together with sodium citrate and/or glucono-delta-lactone in such an amount as to give a pH of about 4.3± about 1.0; knead uniformly to provide chewing gum.

The present invention is now described in greater detail by reference to the following non-limiting examples.

EXAMPLE 1

A mixture of APM powder (10 kg) and hydrogenated starch hydrolyzate (90 kg) was added gradually to 360 liters of warm water (30° C.) under vigorous agitation to form a complete solution. The solution was swirled in a high-speed disc spray dryer to form a powder sweetener composition of about 80 mesh.

EXAMPLE 2

A mixture of APM powder (30 kg) and hydrogenated maltose powder (70 kg) was added gradually to 300 liters of warm water (30° C.) under vigorous agitation to form a complete solution. The solution was freeze-dried and the resulting dry solid was pulverized with a feather mill to a size of 40–60 mesh to thereby provide a sweetener composition having small bulk specific density.

EXAMPLE 3

A mixture of APM powder (90 kg) and hydrogenated starch hydrolyzate powder (10 kg) was added gradually to 400 liters of warm water (28° C.) under vigorous agitation to form a complete solution. The solution was homogenized in a homogenizer at 150 kg/cm$^2$ and dried with a nozzle type spray dryer. The solid product obtained was pulverized in an impact mill to a size of 150 mesh. The powder was fed to a fluidized bed granulating machine where it was sprayed with a 5% aqueous solution of hydrogenated starch hydrolyzate to form a granular sweetener composition of 40 mesh.

The sweetener compositions prepared in Examples 1 to 3 were subjected to a cold water solubility test. The results are shown in the following table in comparison with the solubility of APM. The products of Examples 1 to 3 had satisfactory solubilities in cold water.

TABLE 1

| | Cold water solubility of sweetener compostions (15 g/100 ml of water, 10° C. | | | |
|---|---|---|---|---|
| Sample | Ex. 1 | Ex. 2 | Ex. 3 | APM |
| Solubility (sec.) | 25 | 20 | 30 | 900 |

A magnetic stirrer (3 turns/sec) was used to agitate each sample.

EXAMPLE 4

Step 1: Preparation of APM encapsulated sweetener

An intimate mixture of APM powder (1 kg) and hydrogenated starch hydrolyzate (10 kg, DE before hydrogenated: 15) was added to 30 liters of warm water (30° C.), and the mixture was stirred well to form a complete solution. The solution was homgenized in a homogenizer at 130 kg/cm$^2$. The homogenized solution was swirled in a high-speed rotary nozzle spray dryer to form a fine particulate APM-encapsulated sweetener of about 140 mesh.

Step 2: Production of chewing gum

Chewing gum was produced from a mixture of the following ingredients:

| Ingredients | Weight Percent |
|---|---|
| Chewing gum base | 25.0 |
| Sorbitol | 15.4 |
| Hydrogenated starch hydrolyzate (DE before hydrogenation: 15) | 54.0 |
| Sweetener (as prepared in Step 1, 10% APM) | 0.6 |
| Flavoring (peppermint) | 1.5 |
| Lecithin | 1.0 |
| Glycerin | 2.0 |

Sorbitol, hydrogenated starch hydrolyzate, lecithin and glycerin were added to the chewing gum base and the mixture was kneaded uniformly in a powerful mixer at 55° C. To the mixture, the flavoring and the APM encapsulated sweetener prepared in Step 1 were added and the resulting mixture was kneaded for about 4 minutes. The so prepared chewing gum bar was rolled into a sheet, cooled, cut into pieces of a given size and packaged to provide finished sugarless chewing gum products. The products had an elegant sweetness and a smooth texture. Their flavor and sweetness lasted long in the mouth during chewing.

EXAMPLE 5

Step 1: Preparation of APM encapsulated sweetener

An intimate mixture of APM powder (1 kg) and hydrogenated starch hydrolyzate (99 kg, DE before hydrogenation: 10) was added to 300 liters of warm water (28° C.), and the mixture was stirred well to form a complete solution. The solution was homogenized in a homogenizer at 140 kg/cm$^2$. The homogenized solution was swirled in a high-speed rotary nozzle spray dryer to form a fine particulate APM-encapsulated sweetener of about 140 mesh.

Step 2: Production of chewing gum

Chewing gum was produced from a mixture of the following ingredients:

| Ingredients | Weight Percent |
| --- | --- |
| Chewing gum base | 28.0 |
| Sorbitol | 15.0 |
| Sweetener (as prepared in Step 1, 1.0% APM) | 53.0 |
| Flavoring | 2.0 |
| Lecithin | 1.0 |
| Glycerin | 1.0 |

Sorbitol, lecithin and glycerin were added to the chewing gum base and the mixture was kneaded uniformly with a powerful mixer at 50° C. To the mixture, the flavoring and the APM encapsulated sweetener prepared in Step 1 were added and the resulting mixture was kneaded for about 8 minutes. The so prepared chewing gum bar was rolled into a sheet, cooled, cut into pieces of a given size and packaged to provide finished sugarless chewing gum products. The products had an elegant sweetness and a soft mouthfeel. Their flavor and sweetness lasted long in the mouth during chewing.

EXAMPLE 6

Step 1: Preparation of APM-encapsulated sweetener

An intimate mixture of APM powder (1 kg), hydrogenated starch hydrolyzate (1 kg, DE before hydrogenation: 30) and gum arabic (1 kg) was added to 50 liters of warm water (40° C.), and the mixture was stirred well to form a complete solution. The solution was homogenized in a homogenizer at 140 kg/cm$^2$. The homogenized solution was swirled in a high-spped rotary nozzle spray dryer to form a fine particulate APM-encapsulated sweetener of about 140 mesh.

Step 2: Production of chewing gum

Chewing gum was produced from a mixture of the following ingredients:

| Ingredients | Weight percent |
| --- | --- |
| Chewing gum base | 25.0 |
| Hydrogenated starch hydrolyzate (DE before hydrogenation: 15) | 25.0 |
| Sorbitol | 15.0 |
| Mannitol | 30.0 |
| Sweetener (as prepared in Step 1, 33% APM) | 0.7 |
| Flavoring | 2.0 |
| Lecithin | 1.0 |
| Glycerin | 1.0 |

Sorbitol, mannitol, lecithin and glycerin were added to the gum base that had been softened by heating, and the mixture was kneaded uniformly in a powerful mixer at 150° C. To the mixture, an intimate blend of the flavoring, APM-encapsulated sweetener prepared in Step 1 and the hydrogenated starch hydrolyzate was added, and the resulting mixture was kneaded for 8 more minutes. The so prepared chewing gum bar was rolled into a sheet, cooled, cut into pieces of a given size and packaged to provide finished sugarless chewing gum products. The products had an elegant sweetness, were satisfactorily elastic and had good mouthfeel.

The residual APM in each of the chewing gums prepared by Examples 4, 5 and 6 was determined by allowing them to stand at 32° C. The results are shown in the following Table.

TABLE 2

| Product | Percent Residual APM (Just after preparation - 100%) | | |
| --- | --- | --- | --- |
| | 4 weeks | 6 weeks | 10 weeks |
| Example 4 | 85 (%) | 83 (%) | 80 (%) |
| Example 5 | 80 | 80 | 78 |
| Example 6 | 80 | 80 | 80 |

EXAMPLE 7

Step 1: Preparation of APM encapsulated sweetener

An intimate mixture of APM powder (1 kg) and hydrogenated starch hydrolyzate (10 kg, DE before hydrogenation: 15) was added to 30 liters of warm water (30° C.), and the mixture was stirred well to form a complete solution. The solution was homogenized in a homgenizer at 130 kg/cm$^2$. The homogenized solution was swirled in a high-speed rotary nozzle spray dryer to form a fine particulate APM-encapsulated sweetener of about 140 mesh.

Step 2: Preparation of chewing gum base

A chewing gum base was prepared by mixing the following ingredients in a kneader at 120° C.

| Ingredients | Weight percent |
| --- | --- |
| Graft polymer | 50 |
| Ester gum | 15 |
| Wax | 10 |
| Plasticizer | 9 |
| Lecithin (emulsifier) | 1 |
| Microcrystalline cellulose powder (average particle size: 60 $\mu$) | 15 |

Step 3: Production of chewing gum

Chewing gum was produced from a mixture of the following ingredients.

| Ingredients | Weight percent |
| --- | --- |
| Chewing gum base | 22 |
| Sorbitol | 20 |
| Mannitol | 20 |
| Hydrogenated starch hydrolyzate (DE before hydrogenation: 15) | 31 |
| Sweetener (as prepared in Step 1, 10% APM) | 5 |
| Flavoring (pepermint) | 2 |

Sorbitol, mannitol, and hydrogenated starch hydrolyzate were added to the chewing gum base and the mixture was kneaded uniformly in a powerful mixer at 55° C. To the mixture, the flavoring and the APM encapsulated sweetener prepared in Step 1 were added and the resulting mixture was kneaded for about 4 minutes. The so prepared chewing gum was rolled into a sheet, cooled, cut into pieces of a given size and packaged to provide finished sugarless chewing gum products. The products had an elegant sweetness and a smooth texture. Their flavor and sweetness lasted long in the mouth during chewing.

EXAMPLE 8

Step 1: Preparation of APM encapsulated sweetener

An encapsulated sweetener of about 140 mesh was prepared as in the first step of Example 7.

Step 2: Preparation of chewing gum base

A chewing gum base was prepared by thoroughly mixing the following ingredients in a kneader at 200° C.

| Ingredients | Weight percent |
| --- | --- |
| Natural resin for chewing gum base | 24 |
| Vinyl acetate resin | 50 |
| Polyisobutylene | 10 |
| Microcrystalline wax | 5 |
| Lecithin (emulsifier) | 1 |
| Microcrystalline cellulose powder | 10 |

Step 3: Production of chewing gum

Chewing gum was produced from a mixture of the following ingredients.

| Ingredients | Weight percent |
| --- | --- |
| Chewing gum base (as prepared in Step 2) | 25 |
| Sorbitol | 20 |
| Hydrogenated maltose | 51 |
| Flavoring | 1 |
| Sweetener (as prepared in Step 1, 10% APM) | 3 |

Sorbitol, hydrogenated maltose and the sweetener were added to the chewing gum base and the mixture was kneaded uniformly with a powerful mixer at 55° C. for about 15 minutes. To the mixture, the flavoring was added and the resulting mixture was kneaded for about 3 minutes. The so prepared chewing gum was rolled into a sheet, cooled, cut into pieces of a given size and packaged to provide finished sugarless chewing gum products. The products had an elegant sweetness and a soft mouthfeel. Their flavor and sweetness lasted long in the mouth during chewing.

EXAMPLE 9

Chewing gum was produced from a mixture of the following ingredients.

| Ingredients | Weight percent |
| --- | --- |
| Chewing gum base (as prepared in Step 2 of Example 7) | 25.0 |
| Hydrogenated starch hydrolyzate (DE before hydrogenation: 15) | 25.0 |
| Sorbitol | 15.0 |
| Mannitol | 30.0 |
| Sweetener (encapsulated APM as prepared in Step 1 of Example 7) | 0.7 |
| Flavoring | 2.0 |
| Lecithin | 1.0 |
| Glycerin | 1.0 |

Sorbitol, mannitol, lecithin and glycerin were added to the gum base that had been softened by heating, and the mixture was kneaded uniformly in a powerful mixer at 150° C. To the mixture, an intimate blend of the flavoring, encapsulated APM and the hydrogenated starch hydrolyzate was added, and the resulting mixture was kneaded for 8 more minutes. The so prepared chewing gum was rolled into a sheet, cooled, cut into pieces of a given size and packaged to provide finished sugarless chewing gum products. The product had an elegant sweetness, were satisfactorily elastic and had good mouthfeel.

The residual APM in each of the chewing gums prepared by Examples 7, 8, and 9 was determined by allowing them to stand at 32° C. The results are shown in the following Table.

TABLE 3

| | Percent Residual APM (Just after preparation - 100%) | | |
| --- | --- | --- | --- |
| Product | 4 weeks | 8 weeks | 10 weeks |
| Example 7 | 95 (%) | 92 (%) | 90 (%) |
| Example 8 | 94 | 91 | 89 |
| Example 9 | 93 | 90 | 90 |
| Control (prepared as in Example 1 using a chewing gum base containing $CaCO_3$) | 85 | 82 | 80 |

EXAMPLE 10

Step 1: Preparation of APM encapsulated sweetener

An intimate mixture of APM powder (3 kg) and hydrogenated starch hydrolyzate (97 kg) was first prepared. To the mixture, 500 g of citric acid and 500 g of sodium citrate were added. The resulting mixture was added to 300 liters of warm water (30° C.) and stirred well to form a complete solution. The solution was homogenized in a homogenizer at 140 kg/cm$^2$. The homogenized solution was dried with a high-speed disc spray dryer to form a fine particulate APM-encapsulated sweetener of about 130 mesh.

Step 2: Production of chewing gum

Chewing gum was produced from a mixture of the following ingredients.

| Ingredients | Weight percent |
| --- | --- |
| Chewing gum base | 25.5 |
| Mannitol | 6.5 |
| Sweetener (as prepared in Step 1) | 62.0 |
| Flavoring (peppermint) | 2.0 |
| Lecithin | 1.0 |
| Glycerin | 2.0 |

Lecithin and glycerin were added to the chewing gum base and the mixture was kneaded uniformly in a powerful mixer at 50° C. To the mixture, mannitol and the APM encapsulated sweetener prepared in Step 1 were added and the resulting mixture was kneaded for about 15 minutes. The flavoring was added and the mixture was kneaded for about 3 minutes. The so prepared chewing gum was rolled into a sheet, cooled, cut into pieces of a given size and packaged to provide finished sugarless chewing gum products. The products had an elegant sweetness and a smooth texture. Their flavor and sweetness lasted long in the mouth during chewing.

EXAMPLE 11

Step 1: Preparation of APM encapsulated sweetener

An intimate mixture of APM powder (1 kg) and hydrogenated starch hydrolyzate (99 kg) was first prepared. To the mixture, 400 g of glucono-delta-lactone was added. The resulting mixture was added to 300 liters of warn water (28° C.), and the mixture was stirred well to form a complete solution. The solution was homogenized in a homogenizer at 140 kg/cm$^2$. The homogenized solution was swirled in a high-speed rotary nozzle spray dryer to form a fine particulate APM-encapsulated sweetener of about 140 mesh.

Step 2: Production of chewing gum

Chewing gum was produced from a mixture of the following ingredients.

| Ingredients | Weight percent |
|---|---|
| Chewing gum base | 27.0 |
| Sorbitol | 15.0 |
| Sweetener (as prepared in Step 1) | 54.0 |
| Flavoring | 2.0 |
| Lecithin | 1.0 |
| Glycerin | 1.0 |

Sorbitol, lecithin and glycerin were added to the chewing gum base and the mixture was kneaded uniformly with a powerful mixer at 55° C. To the mixture, the APM encapsulated sweetener prepared in Step 1 was added and the resulting mixture was kneaded for about 10 minutes. The flavoring was then added and the mixture was kneaded for about 4 minutes. The so prepared chewing gum was rolled into a sheet, cooled, cut into pieces of a given size and packaged to provide finished sugarless chewing gum products. The products had an elegant sweetness and a soft mouthfeel. Their flavor and sweetness lasted long in the mouth during chewing.

The residual encapsulated APM in each of the chewing gums prepared by Examples 10 and 11 was determined by allowing them to stand at 32° C. The results are shown in the following Table.

TABLE 4

| Product | Percent Residual APM (Just after preparation - 100%) | | |
|---|---|---|---|
| | 4 weeks | 8 weeks | 10 weeks |
| Example 10 | 90 (%) | 87 (%) | 85 (%) |
| Example 11 | 92 | 89 | 88 |
| Control (prepared as in Example 1 except that no citric acid was used) | 85 | 82 | 80 |

What is claimed is:

1. An improved sugarless chewing gum containing a sweetener composition consisting essentially of L-aspartyl-L-phenylalanine methyl ester, hydrogenated starch hydrolyzate and/or hydrogenated maltose and a sugar alcohol, the improvement comprising: a chewing gum base wherein calcium carbonate and talc are replaced by microcrystalline cellulose powder; and an edible organic acid and sodium citrate and/or glucono-delta-lactose in an amount sufficient to give a ph of 3.3 to 5.3.

2. A process for preparing sugarless chewing gum of claim 1 comprising dissolving L-aspartyl-L-phenylalanine methyl ester and hydrogenated starch hydrolyzate and/or hydrogenated maltose in water, drying the mixture into a solid, reducing the solid to fine particles to form an encapsulated sweetener of L-aspartyl-L-phenylalonine methyl ester, and mixing the sweetener with a chewing gum base wherein calcium carbonate and talc are replaced by microcrystalline cellulose powder, sugar alcohol and an edible organic acid.

3. The sugarless chewing gum of claims 1 wherein said sugar alcohol is mannitol, sorbitol or a mixture thereof.

4. Sugarless chewing gum composition of claim 1 wherein said L-aspartyl-L-phenylalanine methyl ester is encapsulated with the hydrogenated starch hydrolyzate and/or hydrogenated maltose.

5. The sugarless chewing gum composition of claim 1 wherein the microcrystalline cellulose powder has a particle size from 10 to 100 microns.

6. The sugarless chewing gum composition of claim 1 wherein the edible organic acid is citric acid, malic acid, and/or tartaric acid.

* * * * *